Sept. 8, 1964  G. L. MITTELSTEADT  3,147,893
CAM ACTUATED POWDER MEASURE DEVICE
Filed April 11, 1963
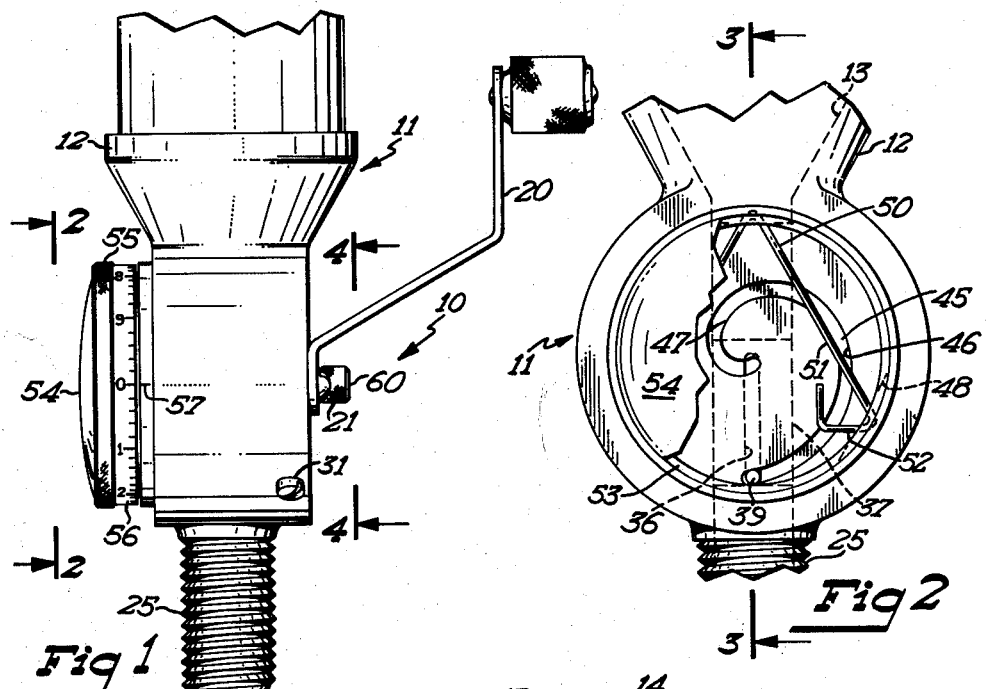
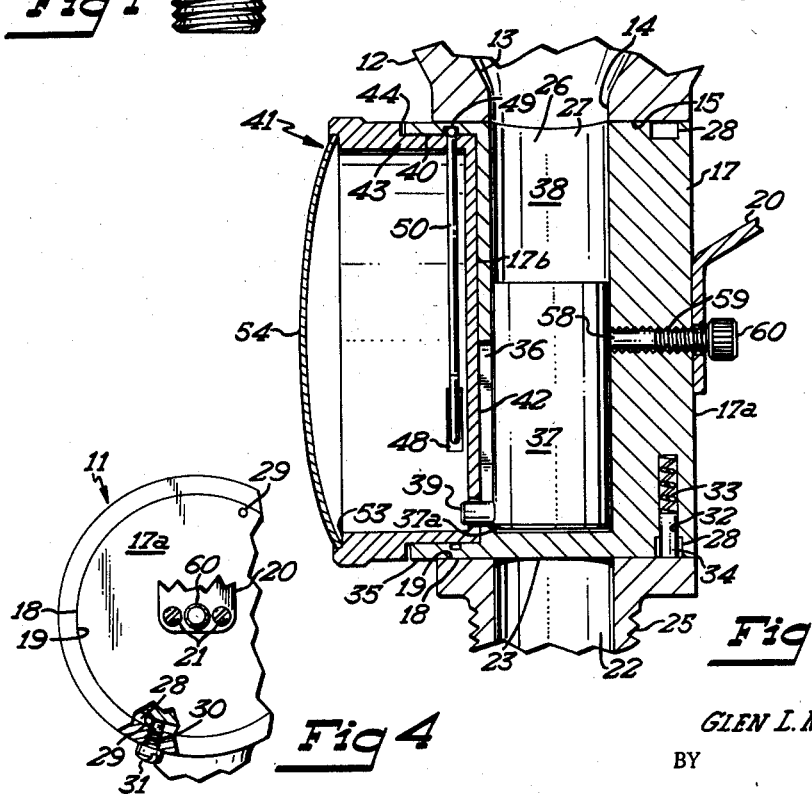
INVENTOR.
GLEN L. MITTELSTEADT
BY
Williamson & Palmatier
ATTORNEYS United States Patent Office 3,147,893
Patented Sept. 8, 1964

3,147,893
CAM ACTUATED POWDER MEASURE DEVICE
Glen L. Mittelsteadt, Waseca, Minn., assignor to Herter's Inc., Waseca, Minn., a corporation of Minnesota
Filed Apr. 11, 1963, Ser. No. 272,369
7 Claims. (Cl. 222—306)

This invention relates to a device for measuring gun powder and more specifically to a powder measuring and dispensing device for accurately measuring and dispensing a preselected volume of gun powder in connection with loading and reloading of cartridges and shells.

An object of this invention is to provide a novel and improved powder measure device including a housing accommodating a rotor provided with an adjustable powder measuring cell, and having a uniquely arranged cam mechanism for effectively adjusting the size of the powder measuring cell whereby accurate preselected amounts of gun powder may be readily measured and dispensed.

Another object of this invention is to provide a novel powder measure device, of simple and inexpensive construction, including a measuring and dispensing rotor for accurately measuring by volume predetermined amounts of powder, and which is adjustable through the mediary of a rotor mounted cam mechanism suitably calibrated to permit highly accurate presetting of the device with a minimum of effort and adjustment.

A further object of this invention is to provide a cam control powder measure device for measuring gun powder and the like which is adaptable for not only accurately measuring predetermined amounts of gun powder during a loading or reloading operation but which is so arranged and constructed that the measuring operation may be conducted with a greater degree of safety than many comparable devices.

These and other objects and advantages of my invention will more fully appear from the following description made in connection with the accompanying drawing wherein like character references refer to the same or similar parts throughout the several views, and in which:

FIG. 1 is an elevational view of the powder measure device;

FIG. 2 is a detailed elevational view on an enlarged scale taken approximately along line 2—2 of FIG. 1 and looking in the direction of the arrows and with certain parts thereof broken away for clarity;

FIG. 3 is a detailed cross sectional view on an enlarged scale taken approximately along line 3—3 of FIG. 2 and looking in the direction of the arrows; and FIG. 4 is a fragmentary elevational view taken approximately along line 4—4 of FIG. 1 and looking in the direction of the arrows, and with certain parts thereof broken away for clarity.

Referring now to the drawing and more specifically to FIG. 1 it will be seen that one embodiment of my novel powder measure device, indicated generally by the reference numeral 10, is there shown. The powder measure device 10 includes a rigid metal housing 11 having an upper portion forming an open topped hopper 12 for funneling gun powder downwardly along the downwardly converging hopper walls 13. The hopper walls 13 terminate downwardly in a supply opening 14 which communicates between the bottom of the hopper 12 and the upper portion of the cylindrical rotor mounting chamber 15 at the intermediate portion of the housing.

The cylindrical chamber 15 has its central axis horizontally oriented so as to rotatably or swingably mount a cylindrical rotor therein. It will be noted that the cylindrical peripheral surface 18 of the rotor 17 is related to the inner peripheral wall surface 19 of the chamber 15 in closely fitting and relatively tight-fitting relation so as to prevent any quantities of powder from collecting between the peripheral walls, but also to permit turning of the rotor 17 in the chamber 15. A handle 20 is attached as by screws 21 to one end 17a of the rotor 17 to effect turning of the rotor.

The lower portion of the housing defines a downwardly extending passage 22 therethrough and communicating with the chamber 15 at the discharge port 23 at the lower side of the chamber 15. The lower portion of the housing is threaded internally (not shown) and externally as at 25 to facilitate attachment of the powder measure device to a supporting appliance and to facilitate attachment of other devices for guiding a measured quantity of powder being discharged.

The rotor 17 has a diametrically extending piston receiving recess or opening 26 therein. It will be noted that this piston receiving recess 26 while extending substantially through the rotor 17 does not extend completely through the rotor. One end portion 27 of the opening 26 communicates alternately with the supply port 14 and the discharge port 23 as the rotor is revolved during the measuring and dispensing operation.

The rotor 17 also has an annular groove 28 formed therein adjacent said end 17a as best seen in FIG. 4. The rotor 17 is also provided with a pair of stop pins 29 which traverse the annular groove 28 at points located approximately 180° from each other. The intermediate portion of the housing 11 has a threaded aperture therethrough for receiving a threaded bolt 31 therethrough, the end of the bolt projecting into the groove 28 and being alternately engageable with the stop pins 29 for limiting rotation of the rotor 17. It will be noted that the stop pins 29 are located approximately 180° apart thereby permitting approximately 180° rotation of the rotor 17. When one of the stop pins 29 is in engaging relation with the bolt 31, the rotor will be in the position illustrated in FIG. 3 wherein the open end of the recess 27 communicates with the supply opening 14 and when the other of the stop pins 29 engages the stop bolt 31, the open end 27 of the recess 26 will be disposed downwardly in communicating relation with the discharge port 23.

Means are also provided for urging the upper peripheral surface of the rotor 17 into engaging relation with the corresponding peripheral surface of the chamber 15 when the rotor is disposed in the condition where the open end of the recess 26 is disposed upwardly and in communicating relation with the supply opening 14. To this end it will be seen that the rotor 17 is provided with a recess 32 therein which is diametrically arranged adjacent one end of the rotor and which, as shown, has an open end communicating with the annular groove 28. This small recess 32 communicates exteriorly in a direction diametrically opposed to the open end 27 of the piston receiving recess 26. This small recess also accommodates therein a small coil spring 33 and a plunger pin 34, the latter being urged against the inner peripheral surface of the chamber 15. Thus it will be seen that when the rotor is positioned as illustrated in FIG. 3 so that the open end 27 of the piston receiving recess is disposed upwardly, the rotor will be urged upwardly against the chamber by the spring urge effect of the plunger pin 34. This arrangement produces a snugfitting relation of the rotor in the chamber 15 whereby little if any gun powder may pass between the peripheral edge of the rotor and the inner peripheral surface of the chamber 15.

The other end 17b of the rotor 17 has an annular flange 35 integrally formed therewith and projecting axially therefrom. The end 17b of the rotor 17 has an elongate generally radially extending slot 36 therein extending from approximately the axial center of the rotor and terminating radially adjacent the annular flange 35.

It will be noted that this slot 36 communicates with the piston receiving recess 26 as best seen in FIG. 3.

A piston 37 is slidably mounted in tight fitting relation within the piston receiving recess 26 and cooperates with the piston receiving recess and open end thereof in defining a measuring cell 38 of variable size. The piston 37 has a generally cylindrical configuration and is provided with a cam follower element 39 fixedly connected therewith and projecting radially outwardly from adjacent the lower end thereof. This cam follower element, as best seen in FIG. 2, is of generally circular cross sectional configuration and presents a generally arcuate upwardly facing cam follower surface. It will also be noted that this cam follower element 39 projects through the slot 36 and is movable therein when the piston 37 is moved axially of the recess 26.

Referring again to FIG. 3 it will be seen that the flange 35 projects outwardly beyond the general confines of the housing 11 and cooperates with the end 17b of the rotor 17 to define a generally cylindrically shaped cam receiving recess 40. This cam recess 40 rotatably accommodates the cam mechanism 41 which, as seen, includes a substantially flat circular plate-like rigid cam 42 having an annular flange 43 integrally formed therewith. The annular flange 43 projects axially outwardly beyond the annular flange 35 of the rotor 32 and is provided with an exterior annular shoulder 44 which is positioned in close proximity with the end edge of the rotor flange 35. It will be noted that the cam 42 is positioned against the end 17b of the rotor 17 when the cam mechanism is positioned within the cam receiving recess 40.

The cam 42 is provided with a curved slot 45 which defines a curved camming edge 46 as best seen in FIG. 2. It will be noted that the slot 45 which defines the camming edge 46 is curved from the center in generally spiral or volute fashion and terminates adjacent the periphery or circumference of the cam 43. It is to be particularly noted that the respective ends of the slot 45 are disposed adjacent the respective ends of the slot 36 in the end 17b of the rotor 17. Thus it will be seen that when the cam 42 is rotated about its axis through 360°, the cam follower element 39 will be moved from one end of the slot to the other. For example, if the cam 42 is rotated in a clockwise direction as viewed in FIG. 3, the camming edge 46 will urge or cam the cam follower element 39 in an upwardly direction relative to the slot 36 and will thereby move the piston 37 upwardly with respect to the piston receiving recess 26. The size of the measuring cell 38 will thereby be reduced when the piston is urged upwardly.

However, if the piston were in its uppermost position so that the center of the rotor were adjacent the centrally located end of the slot 46, counter-clockwise rotation of the cam would cause the camming edge 47 to progressively urge the pin downwardly of the slot 36 and towards the full line position illustrated in FIG. 2. This arrangement would serve to increase the size of the powder measuring cell 38.

Means are provided for releasably retaining the cam mechanism 41 within the cam receiving recess 40 and to this end the annular flange 43 of cam mechanism 41 is provided with three circumferentially spaced-apart slots 48 therethrough. The inner peripheral wall surface of the flange 35 of the rotor 17 is provided with an annular groove 49 therein which is disposed in registering relation with the slots 48 in the cam mechanism 41. A generally triangular retaining spring member 50 is positioned within the confines of the cam mechanism 41 and this retaining member is constructed of an elongate piece of spring steel bent to define a pair of legs 51, the apex of which extends through one of the slots 48 and into the groove 49. The lower ends of each of the legs 51 are bent as at 52 to define arcuate portions projecting through the other of the slots 48 and into the groove 49. This retaining member 50 is preformed so that when it is positioned so that the arcuate bearing portions thereof project through the slots and into the groove 49, these arcuate bearing portions engage the groove surface with a predetermined tension. Thus this retaining member 50 not only serves as a three point releasable locking means for retaining the cam mechanism 41 in the cam receiving recess but this retaining member also serves to retain the cam in a preselected adjusted position relative to the rotor 17.

In order to prevent foreign matter from contaminating and clogging the cam mechanism rotor and piston 37, the flange 43 is provided with an internal shoulder 53 at its outer end for cooperatively engaging a cover or closure plate 54 which is of generally circular concave-convex configuration. Referring now to FIG. 1 it will be seen that the terminal peripheral portion of the flange 43 is knurled as at 55 to present a gripping surface to facilitate rotation of the cam mechanism 41. The exterior surface of the flange 43 is also calibrated with suitable indicia to present a circumferentially arranged scale 56. The exterior surface of the flange 35 of the rotor 17 is also provided with a reference indicia 57 to permit direct reading of the calibrated scale by a user. It will be noted that the scale 56 extends through 360° thus permitting a user to determine the proper position of the piston 37 for adjusting the cell 38 to the desired volume measure.

Means are also provided for locking the piston 37 in a predetermined position and for also serving as a braking medium for preventing accidental displacement of the cam mechanism and the piston. This means includes a plastic, preferably nylon element 58 positioned within a threaded aperture 59 formed in the rotor 17. It will be noted that the threaded aperture 59 intercommunicates the piston receiving recess with the exterior and is disposed in coaxial relation with respect to the rotor 17. The handle 20 is also provided with an aperture disposed in registering relation with the threaded aperture 59 in the rotor 17. A pressure applying bolt 60 extends through the aperture in the handle and is threadedly engaged with the threaded aperture 59 as best seen in FIG. 3. The inner end of the bolt 60 may be adjusted to bear against the end of the plastic element 58 whereby a tightening of the bolt serves to urge the plastic element against the piston 37. The bolt may be adjusted to completely lock the piston 37 in a preset position or this bolt may be tightened only enough to serve as a brake so that movement of the piston by the cam must overcome the frictional resistance imparted by the end of the element 58.

In operation, assuming that the piston 37 has been placed in the proper position for adjusting the cell 38 to the desired volume measure, powder will flow downwardly into the cell 38 when the rotor is in the position illustrated in FIGS. 2 and 3. However, when the rotor 17 is swung or rotated through an arc of approximately 180°, the gun powder contained in the cell 38 will be discharged through the port 23 and passage 22 from the dispensing unit.

In adjusting the piston 37, the bolt 60 is first loosened and the cam mechanism 43 is rotated to a predetermined indicia on the calibrated scale 46 and is aligned or coextensive with the reference indicia 47 on the flange 35. Revolving movement of the cam 42 produces progressive linear movement of the piston 37 relative to the piston receiving recess 26. During rotation of the cam 43, either the camming edge 46 or the camming edge 47 serves to engage the cam follower element 39 to move the cam follower element 39 in the slot 36 thus producing the vertical linear movement of the piston 37. As pointed out above, the cam 42 may be revolved through an arc of approximately 360° so that very wide range of adjustment for the measuring cell is possible.

It is further pointed out that the retaining member 50 tends to maintain the cam mechanism 41 in a preset position relative to the rotor 17 but also permits forcible rotation of the cam mechanism. Finally, when the desired setting of the piston, as indicated by the indicia 56 on the cam mechanism 41 in relation to the reference indicia 57 on the rotor 17, the bolt 50 will be tightened so as to clamp or urge the plastic brake element 58 against the side of the piston 37 and thereby positively retain the same in the desired position. With this arrangement, the piston 37 will always be in a predetermined position in the recess 26 when the cam mechanism is set at a predetermined orientation. Thus it will be seen that the cam mechanism 41 may be changed in its setting and returned to an original setting and the volume of cell 38 will be identical to that previously obtained at the same setting of the cam mechanism 41.

It will also be seen that the lower end of the piston 37 adjacent the slot 36 is slightly beveled as at 37a whereby when the rotor is inverted during the dispensing of powder from the cell 38, any powder accumulating within the end of the recess 26 may readily flow outwardly from the recess through the slot 36 and into the cam mechanism 41.

It will therefore be seen from the preceding paragraphs that I have provided a novel powder measure device having a rotor mounted cam actuator for permitting accurate measuring, over an extremely wide range, of predetermined amounts of gun powder during loading or reloading operations.

It will further be seen that I have provided a novel cam control variable measuring device for gun powder and the like, which is not only of simple and inexpensive construction but one which functions in a more efficient manner than any heretofore known comparable devices.

It will of course be understood that various changes may be made in the form, details, arrangement and proportions of the various parts without departing from the scope of my invention.

What is claimed is:

1. A powder measure device for use in measuring predetermined amounts of particulate material such as gun powder, said device comprising a housing defining a cylindrical rotor-mounting chamber having a horizontal axis and having upper and lower sides and a peripheral side wall, the housing having supply and discharge ports respectively communicating with the upper and lower sides of said chamber, a cylindrical rotor mounted concentrically in said chamber for turning about said axis and having an axially extending, generally circular cam-receiving recess in one end thereof, said rotor having a piston-receiving recess therein extending transversely of the rotation axis, said piston-receiving recess having an open end alternately communicating with said supply and discharge ports when the rotor is revolved, said rotor having an elongate slot in one end thereof extending radially from substantially the center of said rotor to a point adjacent the periphery thereof and intercommunicating said piston-receiving and said cam-receiving recesses, a pison slidably mounted within said piston-receiving recess in tight fitting relation therewith and cooperating with said piston-receiving recess and the open end thereof in defining a powder measuring cell of variable size, a cam follower element affixed to said piston and projecting outwardly through said slot and into said cam receiving recess, a substantially flat circular cam mounted in concentrically snug fitting relation within said cam receiving recess and having a curved slot therein defining a pair of similarly shaped curved camming edges of generally spiral configuration engaging said cam follower element for controlling the positioning of the piston, and cooperating releasable interlocking means on said cam and rotor releasably interlocking said cam with said rotor but permitting forcible rotation of said cam relative to said rotor.

2. The device as defined in claim 1, wherein said rotor is provided with a plunger-receiving recess therein spaced from said piston-receiving recess and having an open end facing diametrically oppositely of the open end of said piston-receiving recess, plunger means in said recess engaging the inner wall surface of said chamber and urging the rotor upwardly against the corresponding upper side of said chamber when the open end of said piston-receiving recess of said rotor is in communicating relation with said supply opening whereby to prevent escape of powder between said rotor and chamber side.

3. The device as defined in claim 1 and a piston locking element carried by said rotor for releasably and adjustably engaging the piston to lock the same in a preset position within said piston-receiving slot.

4. A powder measure device for use in measuring predetermined amounts of particulate material such as gun powder, said device comprising a housing defining a cylindrical rotor-mounting chamber having a horizontal axis and having upper and lower sides and a peripheral side wall, the housing having supply and discharge ports respectively communicating with the upper and lower sides of said chamber, a cylindrical rotor mounted concentrically in said chamber for turning about said axis and having an axially extending generally circular cam-receiving recess in one end thereof, said rotor having a piston-receiving recess therein extending transversely of the rotation axis, said piston recess having an open end alternately communicating with said supply and discharge ports when the rotor is revolved, an elongate slot formed in one end of said rotor and extending radially from substantially the center thereof to a point adjacent the periphery of the rotor and interconnecting said piston-receiving and said cam-receiving recesses, a piston slidably mounted within said piston-receiving recess in snug fitting relation therewith and cooperating with the piston-receiving recess and the open end thereof in defining a powder measuring cell of variable size, a cam follower element affixed to said piston and projecting outwardly through said slot and into said cam-receiving recess, a substantially flat circular cam mounted in concentrically snug fitting relation within said cam receiving recess and having an annular flange integrally formed therewith, said cam having a spiral shaped slot therein extending from the center thereof to a point located adjacent the periphery thereof and defining similarly shaped spiralled camming edges engageable with said cam follower element and cooperating therewith for controlling the positioning of the piston, and cooperating releasable interlocking means on said cam and rotor respectively releasably interlocking said cam with said rotor but permitting forcible rotation of said cam relative to said rotor.

5. The device as defined in claim 4, wherein said cooperating releasable interlocking means comprises a plurality of circumferentially spaced slots in said annular flange of said cam, and a resilient tensioned retaining element carried by said cam and having portions thereof projecting through said slots in said flange for frictionally engaging the rotor.

6. A powder measure device for use in measuring predetermined amounts of particulate material such as gun powder and the like, said device comprising a housing defining a cylindrical rotor-mounting chamber having a horizontal axis and having upper and lower sides and a peripheral side wall, the housing having supply discharge ports respectively communicating with the upper and lower sides of said chamber, a cylindrical rotor mounted concentrically in said chamber for turning about said axis and having an axially extending, generally circular cam-receiving recess in one end thereof and having a piston-receiving recess extending transversely of the rotational axis thereof, said piston-receiving recess having an open end alternately communicating with said supply discharge ports when the rotor is revolved, said rotor having an elongate slot in one end thereof extending radially from substantially the center of said rotor to a point adjacent the periphery thereof and interconnecting said piston-receiving and said cam-receiving recesses in communicating relation with respect to each other, an elongate piston slidably mounted within said piston-receiving recess in snug fitting relation therewith and cooperating with said piston-receiving recess and the open end thereof in defining a powder-measuring cell of variable size, a cam follower element affixed to one end of said piston and projecting outwardly through said slot and into said cam-receiving recess, a releasable piston locking element carried by said rotor for releasably and adjustably engaging said piston to lock the same in pre-set relation within said piston receiving recess, a substantially flat circular cam mounted in concentrically snug fitting relation within said cam-receiving recess and having an annular flange rigidly connected therewith, said cam having a curved slot therein defining a pair of similar spiralled camming edges extending generally from the center of said cam outwardly towards the periphery thereof for engaging said cam follower element to control the positioning of said piston, and cooperating releasable interlocking means on said cam and rotor releasably interlocking said cam with said rotor but permitting forcible rotation of said cam relative to said rotor.

7. The device as defined in claim 6, wherein said one end of said rotor is beveled to facilitate the removal of powder material from said piston-receiving recess when the latter is oriented to dispose the open end thereof in communicating relation with said discharge port.

No references cited.